US006588088B2

(12) United States Patent
Dondiz et al.

(10) Patent No.: US 6,588,088 B2
(45) Date of Patent: Jul. 8, 2003

(54) SYSTEM AND METHOD FOR AUTOMATICALLY TENSIONING WIRES AND FOR RETAINING TENSIONED WIRES UNDER TENSION

(75) Inventors: Leopold B. Dondiz, Webster, NY (US); Timothy C. Warren, Rochester, NY (US); Patricia Moran, Rochester Hills, MI (US)

(73) Assignee: Xerox Corporation, Stamford, CT (US)

( * ) Notice: Subject to any disclaimer, the term of this patent is extended or adjusted under 35 U.S.C. 154(b) by 75 days.

(21) Appl. No.: 09/799,042

(22) Filed: Mar. 6, 2001

(65) Prior Publication Data

US 2001/0045003 A1 Nov. 29, 2001

Related U.S. Application Data

(60) Provisional application No. 60/200,876, filed on May 1, 2000.

(51) Int. Cl.[7] .................................................. G01L 5/04

(52) U.S. Cl. ............................. 29/593; 29/452; 73/581; 73/862.41; 73/862.44; 73/862.392

(58) Field of Search ................ 29/593, 452; 140/123.5, 140/71.6; 73/862.391, 862.41, 862.42, 862.44, 862.451, 862.46, 862.392, 581, 862.43, 862.393

(56) References Cited

U.S. PATENT DOCUMENTS

| | | | | | |
|---|---|---|---|---|---|
| 3,942,369 | A | * | 3/1976 | Roggenstein et al. .... | 206/308.3 |
| 4,517,735 | A | * | 5/1985 | Watkins ....................... | 29/621 |
| 5,039,834 | A | * | 8/1991 | Obara et al. ............. | 219/69.12 |
| 5,069,071 | A | * | 12/1991 | McBrien et al. .............. | 73/654 |
| 5,358,165 | A | | 10/1994 | Andoh | |
| 5,424,540 | A | | 6/1995 | Garcia et al. | |
| 5,600,416 | A | | 2/1997 | Hart | |
| 5,756,998 | A | * | 5/1998 | Marks et al. ............... | 250/324 |
| 6,142,023 | A | * | 11/2000 | Cole et al. ..................... | 73/828 |

* cited by examiner

*Primary Examiner*—Gregory Huson
*Assistant Examiner*—Peter deVore
(74) *Attorney, Agent, or Firm*—Oliff & Berridge, PLC

(57) ABSTRACT

A wire tensioning apparatus and method tensions one or more wires by moving the tensioning function from a wire module to an apparatus external to the wire module. Externally to the wire module, a wire is attached to a fixed end and a movable end. Tension is placed on the wire, and the tension in the wire or the vibrational frequency of the wire is detected and compared to a desired value. If the tension in, or the vibrational frequency of, the tensioned wire does not correspond to the desired value, the tension is further adjusted until the desired value is met. Once the desired tension or the vibrational frequency is met, the wire is secured in the wire module in order to maintain the achieved tension and/or vibrational frequency.

27 Claims, 9 Drawing Sheets

FIG. 7
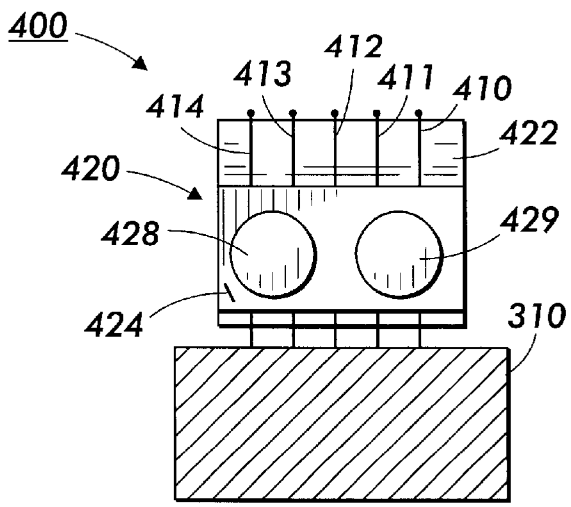
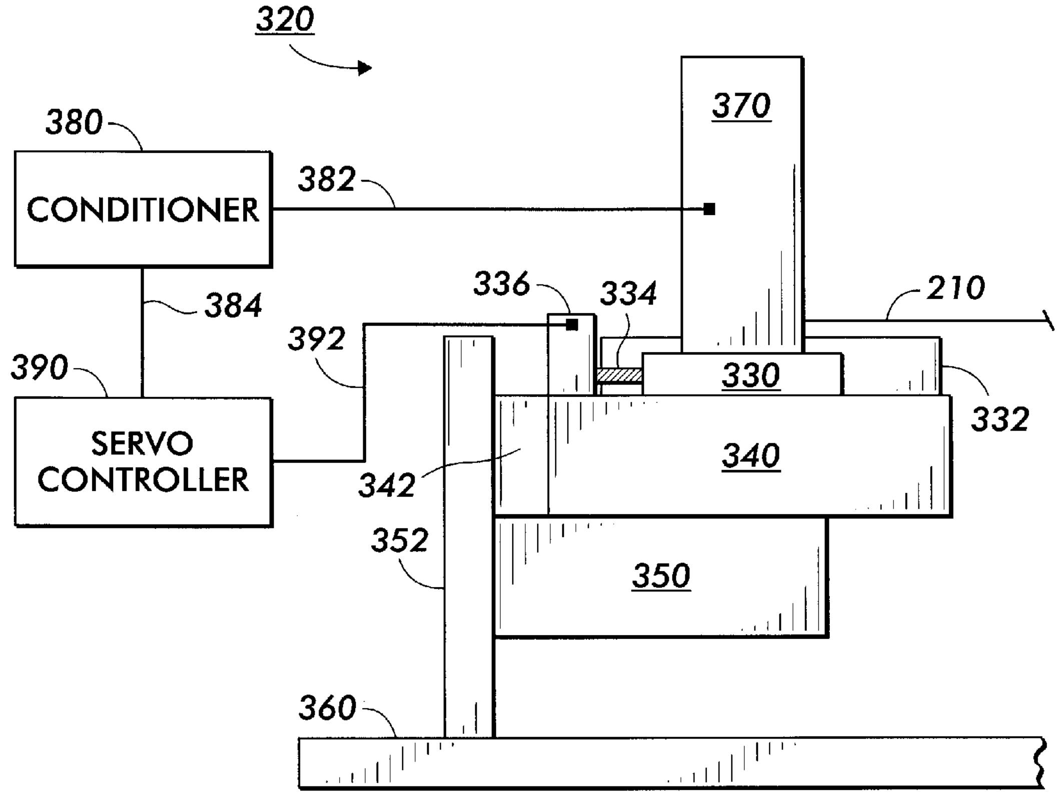
FIG. 8

SYSTEM AND METHOD FOR AUTOMATICALLY TENSIONING WIRES AND FOR RETAINING TENSIONED WIRES UNDER TENSION

This nonprovisional application claims the benefit of U.S. Provisional Application No. 60/200,876, filed May 1, 2000.

BACKGROUND OF THE INVENTION

1. Field of Invention

This invention is directed to tensioning wires and retaining tensioned wires.

2. Description of Related Art

FIG. 1 illustrates one conventional apparatus and technique for tensioning wires and retaining such tensioned wires under tension. As shown in FIG. 1, the current process and apparatus for tensioning wires and retaining the tensioned wires under tension requires each wire 110 to be formed with looped ends 112. As shown in FIG. 1, a wire tension module 100 includes a pair of tensioning portions 120 and 130. End members 124 and 134 of the tensioning portions 120 and 130, respectively, are rigidly mounted and spaced apart on a substrate member 140. Tension blocks 122 and 132 of the tensioning portions 120 and 130, respectively, are slidably placed on the substrate member 140 and attached by screws 128 and 138 to the end members 124 and 134, respectively. Each of the tensioning blocks 122 and 132 includes a post 126 and 136, respectively. The wire to be tensioned 110 is connected between the tension blocks 122 and 132 by placing one of the looped ends 112 over each of the posts 126 and 136.

A tensile force is then placed on the wire to be tensioned 110 by turning one or both of the screws 128 and 138 in a direction that draws the respective blocks 122 and 132 towards the corresponding end members 124 or 134. That is, the screws 128 and/or 138 are turned to move the blocks 122 and 132 away from each other. The tension and, more importantly, the vibrational frequency, in the wire free span is thus set by pulling on one or more of the blocks 122 and/or 132 using the respective screws 128 and 138 to elongate the wire 110.

As shown in FIG. 1, the screws 128 and 138 pass through passages 125 and 135 in the end members 124 and 134, respectively, and engage with threaded passages 123 and 133 formed in the blocks 122 and 132, respectively. It should be appreciated that, based on the amount of elongation of the wire 110 required to obtain the desired tension or vibrational frequency in the wire free span, both end portions 120 and 130 may be required. Alternatively, if only a relatively small of elongation is required to obtain the desired or vibrational frequency, one of the end portions 120 or 130 can be replaced with a post 126 or 136 that is rigidly fixed to an expanded end member 124 or 134.

SUMMARY OF THE INVENTION

However, the inventors of the invention described herein have determined that this process is very difficult to automate and requires an excessively large number of parts in the wire module 100. These two factors lead to a significantly high manufacturing cost for the wire module 100.

This invention provides systems and methods for tensioning wires to be tensioned that moves the tensioning function from the wire module to an apparatus external to the wire module.

This invention separately provides systems and methods for retaining externally-tensioned wires under tension in the wire module.

However, externally tensioning and measuring the tension applied to the wires to be incorporated into the wire module is difficult. In particular, it is often difficult to accurately hold the wire in place or even to accurately handle the wire. Additionally, the wire's own characteristics and/or sensitivities limit the ability of conventional external wire tensioning systems to accurately and repeatedly tension the wires to the desired vibrational frequency.

This invention provides systems and methods for tensioning wires externally to the wire module.

This invention further provides systems and methods for externally tensioning the wires that allows desired tension values to be set, automatically attained, and maintained in a repeatable manner.

This invention separately provides an external tensioning device that can apply and measure tension in a very fine wire.

This invention separately provides systems and methods for applying measuring and maintaining tension using closed loop feedback.

This invention separately provides systems and methods for automatically tensioning wire that permits various tension factors and parameters to be easily set.

By removing the tensioning function from the wire module, the cost of the wire module can be reduced. In particular, shifting the tensioning function to an external wire tensioning apparatus allows the number of parts in the wire module to be reduced and allows more flexibility in automating the tensioning and tensioned wire retaining processes.

According to one exemplary embodiment of the systems and methods for retaining externally-tensioned wires according to this invention, one or more wires are tensioned using an apparatus that is external to the wire module. The one or more externally-tensioned wires to be incorporated into the wire module are then placed, at each end of the wire module, between a first, fixed member and a second, detachable member. Each of the detachable members is detachably attached to the corresponding fixed member. In particular, a force normal to the tension direction in the one or more wires is generated between the detachable and fixed members to clamp or otherwise securely hold the externally tensioned wires at each end of the wire module. This retains the externally applied tension in the wires between the end portions of the wire module. The distance between the end portions of the wire module and the tension in the clamped tensioned wires is selected so that the desired vibrational frequency in the free wire span between the end portions of the wire module is obtained.

In one exemplary embodiment, the clamping surfaces of the first member and the second member extend parallel to the free span of the tensioned wires. In a second exemplary embodiment, the clamping surfaces of the first member and the second member are angled relative to the plane defined by the free span of the tensioned wires. In this second exemplary embodiment, the first member has a curved portion extending between the clamping surface of the first member and the plane defined by the wire free spans of the tensioned wires.

The inventors of this invention have determined that clamping the tensioned wires in this manner will hold the tensioned wires at the desired vibrational frequency. The inventors have also determined that dissimilar materials for the clamping surface improves the long term stability in holding the tensioned wires at the desired vibrational frequency. However, using dissimilar materials for the clamping surface wire is not required.

In one exemplary embodiment of the external wire tensioning systems and methods of this invention, a wire tensioning device includes a base plate. A three-axis slide system is mounted at one end of the base plate and a wire holding fixture is provided at the other end of the base plate. A feedhead assembly is mounted on the three-axis slide system. Two of the slides of the three-axis slide system are used to position the feedhead assembly perpendicular to and across the base plate. The third slide of the three-axis slide system is used to apply tension to the wire between the wire holding fixture at one end of the base plate and the feedhead assembly at the other end of the base plate.

In various exemplary embodiments, the feedhead assembly includes a load cell used to measure the tension applied to the wire between the feedhead assembly and the wire holding fixture. A servo control system inputs a signal from the load cell and applies a drive signal to the third slide of the three-axis slide system based on the difference between a desired wire tension value and the wire tension measured by the load cell. Thus, the load cell servo control system and third slide of the three-axis slide system use closed-loop feedback control.

In one exemplary embodiment of the feedhead assembly including the load cell, the wire to be tensioned is stored on a wire spool. The wire is drawn from the wire spool through a pivot arm and connected to the wire holding fixture at the other end of the base plate. The wire spool is then secured to prevent any additional wire from being withdrawn from the wire spool. When the third slide of the three-axis slide system is driven to a apply tension to the withdrawn portion of the wire, the tension applied to the wire causes the pivot arm to pivot against the load cell. The force of the pivot arm against the load cell generates a load cell signal that is provided to the servo control system.

The servo control system compares the value of the signal from the load cell to a desired load cell value representative of the desired tension to be applied to the withdrawn portion of the wire. When the value of the load cell signal is less than the desired value, the servo control system drives the third slide of the three-axis slide system to move the feedhead assembly away from the wire holding fixture to apply additional tension to the withdrawn portion of the wire. In contrast, when the value of the signal from the load cell is greater than the desired value, the servo control system drives the third slide of the three-axis slide system to move the feedhead assembly closer to the wire holding fixture to reduce the tension on the withdrawn portion of the wire.

In various other exemplary embodiments, rather than placing a load cell in the feedhead assembly to measure the tension in the wire, the vibrational frequency of the wire is measure. In many uses of such tensioned wires, the vibrational frequency, rather than the wire tension, is the critical parameter. Thus, the tension is used only as a proxy for the vibrational frequency.

In various exemplary embodiments, the vibrational frequency is measured electronically, using capacative or inductive sensors. Alternatively, in various other exemplary embodiments, the vibrational frequency is measured mechanically. Regardless of how the vibrational frequency is measured, a servo control system inputs a signal from the vibrational frequency sensor and applies a drive signal to the external-tension applying system, such as the three axis slide system, until the measured vibrational frequency is equal to the desired vibrational frequency. Thus, the servo control system, the external tension applying system and the vibrational frequency sensor form a closed-loop feedback control system.

In various exemplary embodiments, the third slide of the three-axis slide system moves in a direction parallel to the withdrawn portion of the wire. In a second exemplary embodiment, the withdrawn wire is partially wrapped around a first post so that the third slide moves in a direction that is at an angle to the portion of the wire extending between the first post and the wire holding fixture. In a third exemplary embodiment, the wire holding fixture includes a second post. In this case, the wire from the feedhead assembly, whether coming directly from the feedhead assembly or coming from the feedhead assembly after being wrapped around the first post, is wrapped around the second post before being held by the wire holding fixture.

In various exemplary embodiments that combine the external wire tensioning apparatus and the wire module according to this invention, the first and second posts can comprise curved portions of the first members positioned at each end of the wire module.

These and other features and advantages of this invention are described in or are apparent from the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein:

FIG. 7 is an end view of the second exemplary embodiment of the externally-tensioned wire retaining module shown in FIG. 5;

FIG. 8 is a side view of a first exemplary embodiment of an automatic wire tensioning device for automatically tensioning wires externally from a wire retaining module according to this invention;

DETAILED DESCRIPTION OF EXEMPLARY EMBODIMENTS

Figure 1:
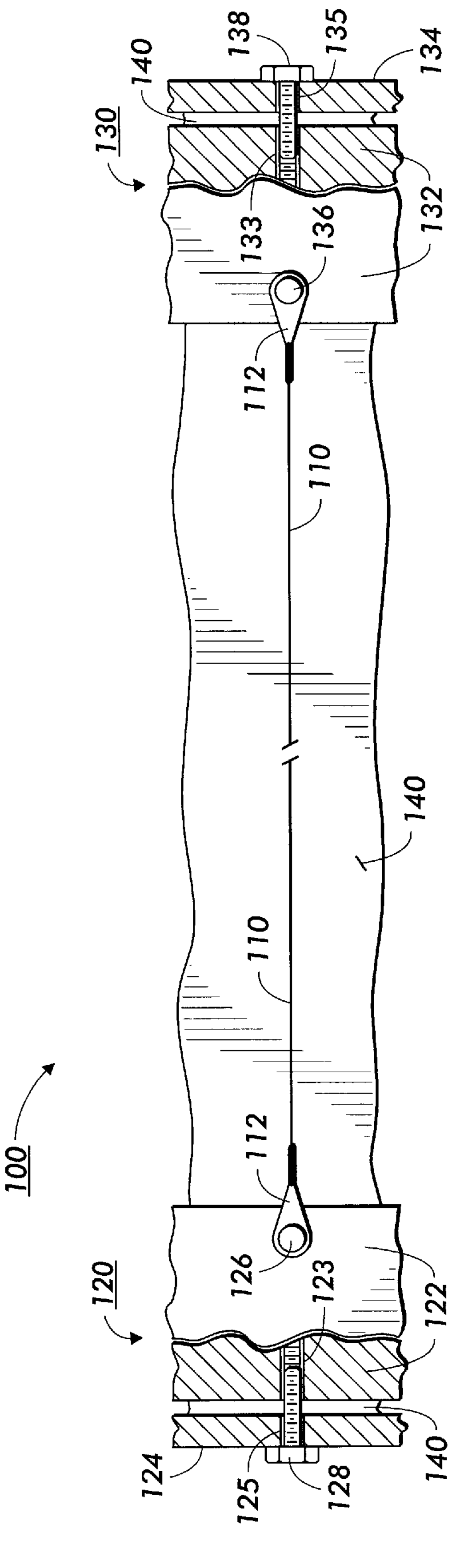
FIG. 1 PRIOR ART
FIG. 1 illustrates a conventional wire module.
Figure 2:
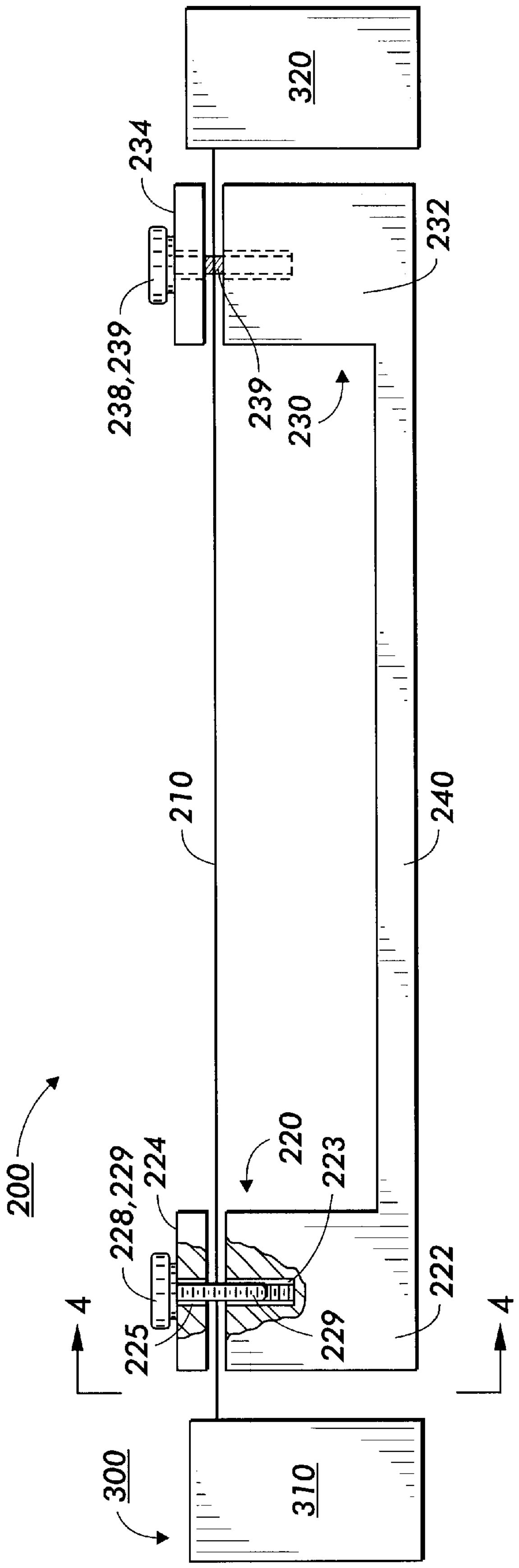
FIG. 2 illustrates one exemplary embodiment of an externally-tensioned wire retaining module for retaining externally-tensioned wires according to this invention.
Figure 3:
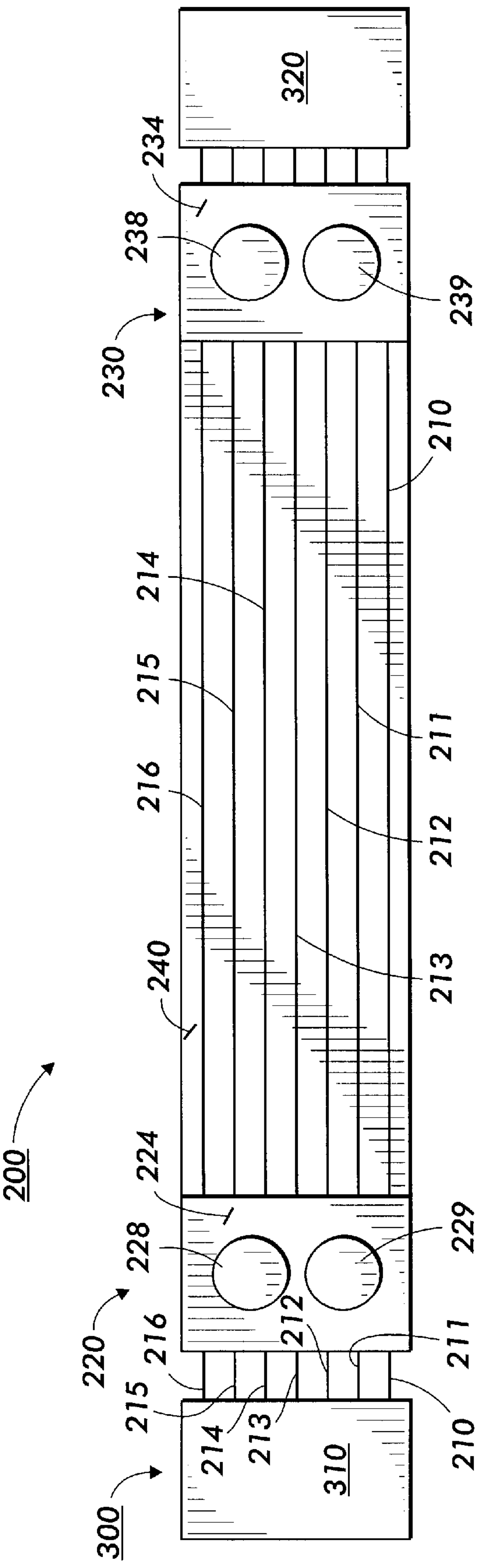
FIG. 3 shows a top view of the externally-tensioned wire retaining module shown in FIG. 2.
Figure 4:
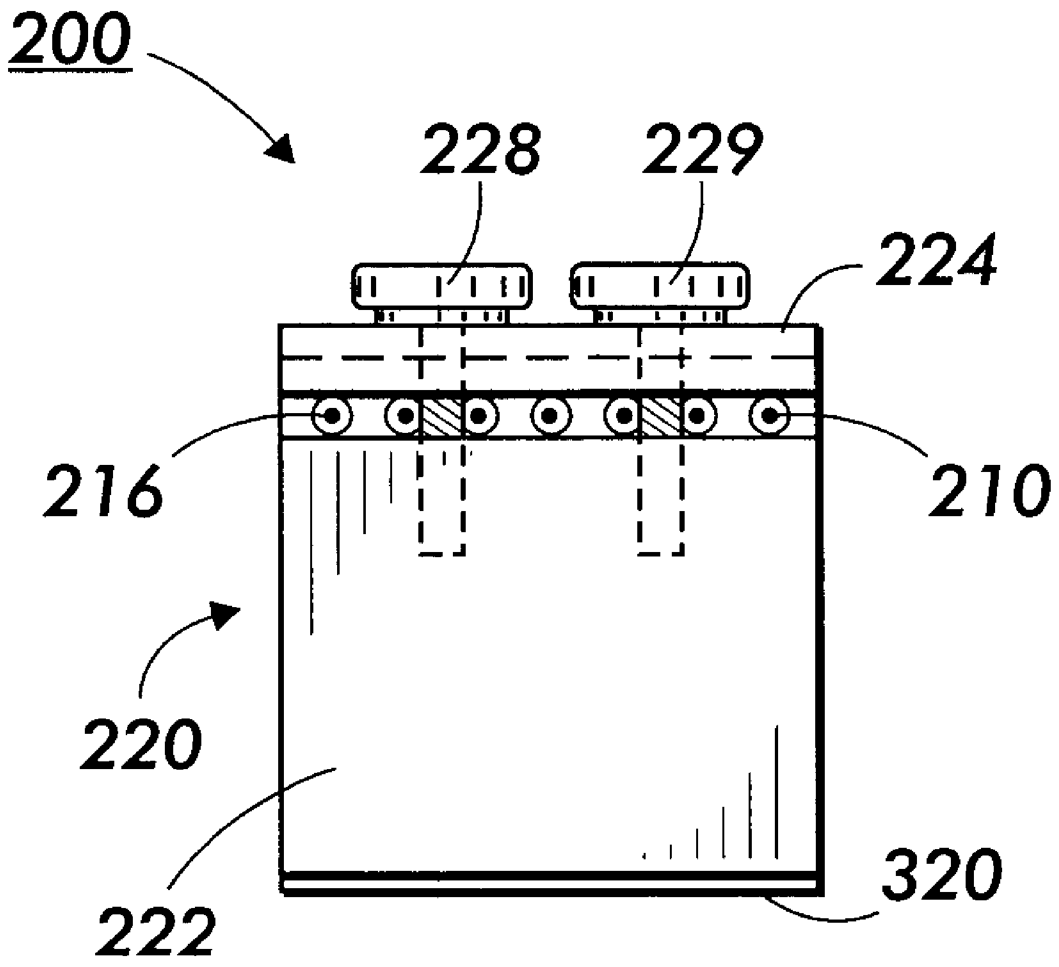
FIG. 4 shows an end view of the externally-tensioned wire retaining module shown in FIG. 2.

FIGS. 2–4 show a first exemplary embodiment of an externally-tensioned wire retaining module 200 according to this invention. As shown in FIGS. 2–4, the externally-tensioned wire retaining module 200 retains one or more externally-tensioned wires 210 between a first tension retaining assembly 220 positioned at one end of a base plate 240 and a second tension retaining assembly 230 positioned at the other of the base plate 240. In particular, in the exemplary embodiment shown in FIGS. 2–4, the one or more externally-tensioned wires 210 are tensioned between a first portion 310 and a second portion 320 of one exemplary embodiment of an external tension applying apparatus 300. Tension to the one or more externally-tensioned wires 210 can be applied in a variety of ways. Examples include winding the one or more externally-tensioned wires on a spool or moving the first portion 310 away from the second portion 320 or any other known or later-developed method. Various exemplary embodiments of such external tension applying devices 300 and 500 will be discussed in greater detail with respect to FIGS. 8–10.

As shown in FIGS. 2–4, the first tension retaining assembly 220 includes a first member 222 fixedly attached to the base plate 240 and a second member or plate 224 that is detachably attached to the first member 222. Similarly, the second wire retaining assembly 230 includes a first member 232 fixedly attached to the base plate 240 and a second member or plate 234 that is detachably attached to the first member 232. In particular, in both tension retaining assemblies 220 and 230, each of the one or more wires 210 to be tensioned and retained using the externally-tensioned wire retaining module 200 passes between the first members 222 and 232 and the plates 224 and 234, respectively.

In particular, the first members 222 and 232 can be fixedly attached to the base plat 240 using any known or later developed technique. Such known techniques include fixing the first and second members 222 and 232 to the base plate 240 by brazing and/or welding, by using an adhesive layer between the first and second members 222 and 232 and the base plate 240, by using a mechanical fastener, such as a bolt, screw, pin, and the like, or any other known fastening technique. Alternatively, the first and second members 222 and 232 can be fixedly attached to the base plate 240 by forming the first and second members 222 and 232 integrally with the base plate 240, or otherwise rendering the first and second members 222 and 232 integral with the base plate 240.

In the particular exemplary embodiment shown in FIGS. 2–4, the detachable plates 224 and 234 are detachably attached to the members 222 and 232 using a pair of screws 228 and 229, and 238 and 239, respectively. In particular, each of the screws 228 and 229 pass through passages 225 formed in the plate 224 and screw into respective ones of a pair of threaded passages 223 formed in the first member 222. Likewise, the screws 238 and 239 pass through passages formed in the plate 234 and screw into threaded passages formed in the first member 232. Once the one or more wires 210 pass over the first members 222 and 232 and are tensioned to the desired tension or vibrational frequency by the external wire tensioning apparatus 300, the plates 224 and 234 are placed over the one or more wires 210 and attached to the blocks 222 and 232, respectively, using the screws 228 and 229, and 238 and 239, respectively.

In particular, the screws 228, 229, 238 and 239 are tightened sufficiently such that the plates 224 and 234 are pressed securely against the first members 222 and 232, respectively, to effectively clamp or otherwise securely hold the one or more wires 210 between the first member 222 and 232 and the corresponding plate 224 and 234. That is, the screws 228, 229, 238 and 239 are used to provide a sufficient force between the members 222 and 232 and the corresponding plates 224 and 234 normal to the direction of tension in the one or more tensioned wires 210 to securely hold the one or more tensioned wires 210 such that the tension in the one or more tensioned wires 210 applied by the external tension applying apparatus 300 does not lessen once the one or more tensioned wires 210 are detached from the external wire tensioning apparatus 300.

In various exemplary embodiments, the first members 222 and 232 are made from different materials than the second members or plates 224 and 234. In various exemplary embodiments, one of the first members 222 and 232 and the second members or plates 224 and 234 are made of materials that are softer than the wires being tensioned 210. In this case, the other of the second members 224 and 234 and the first members 222 and 232 can be made of materials at least as hard as the wires being tensioned 210.

In this case, the softer materials tend to deform around the wire to be tensioned 210 as the wires being tensioned 210 are clamped between the first members 222 and 232 and the second members or plates 224 or 234. As a result, the wires being tensioned 210 tend to be more securely held between the first members 222 and 232 and the second members or plates 224 and 234. Of course, it should be appreciated that only the portions of the first members 222 and 232 and the second members or plates 224 and 234 that are adjacent to the wires to be tensioned 210 need to be made of different materials as outlined above. In this case, the other portions of the first members 222 and 232 and of the second members or plates 224 or 234 can be made of any appropriate materials. It should also be appreciated that the first members 222 and 232 and the second members 224 and 234 do not need to be made of different materials, that one of the materials does not need to be softer than the wires to be tensioned 210, or that one of the materials needs to be at least as hard as the wire to be tensioned 210.

FIGS. 3 and 4 show top and end views of the externally tensioned wire retaining module 220 and illustrate how multiple tensioned wires 210–216 can be positioned and retained by the externally tensioned wire retaining module 200.

While this first exemplary embodiment of the externally tensioned wire retaining module 200 uses the screws 228, 229, 238 and 239 to apply the retaining force between the first members 222 and 232 and the plates 224 and 234, respectively, it should be appreciated that any known or later developed apparatus, device, structure or assembly that is capable of providing a sufficient retaining force between the blocks 222 and 232 and the plates 224 and 234, respectively, can be used in place of the screws 228, 229, 238 and 239. For example, such alternative force applying devices include turn-buckles, lever clamps such as those used in ski boots, loop clamps such as hose clamps, and the like.

Similarly, while the plates 224 and 234 are described as detachable from the corresponding first members 222 and 232, it should be appreciated that, in various other exemplary embodiments of the first and second tension retaining assemblies 220 and 230, the plates 224 and 234 do not have to be detachable from the first members 222 and 232, respectively, as long as the one or more wires 210 to be tensioned can be placed between the plates 224 and 234 and the corresponding first members 222 and 232.

Thus, for example, the plate 224 and/or 234 could be pivotally attached to the corresponding first member 222 and/or 232 so that the plate 224 and/or 234 can be pivoted or rotated away from the corresponding first member 222 and 232 while the one or more wires 210 are placed over the first member 222 and/or 232, and then pivoted or rotated back in place to retain the tension on the one or more wires 210. In general, any known or later developed structure, device or apparatus that permanently or temporarily attaches the plates 224 and 234 to the corresponding first member 222 and 232, such as a pivot pin, a pin hinge, a polymer hinge, a slide structure, or the like, and that also allows the one or more wires 210 to be placed between the plates 224 and 234 and the first members 222 and 232, can be used.

Figure 5:
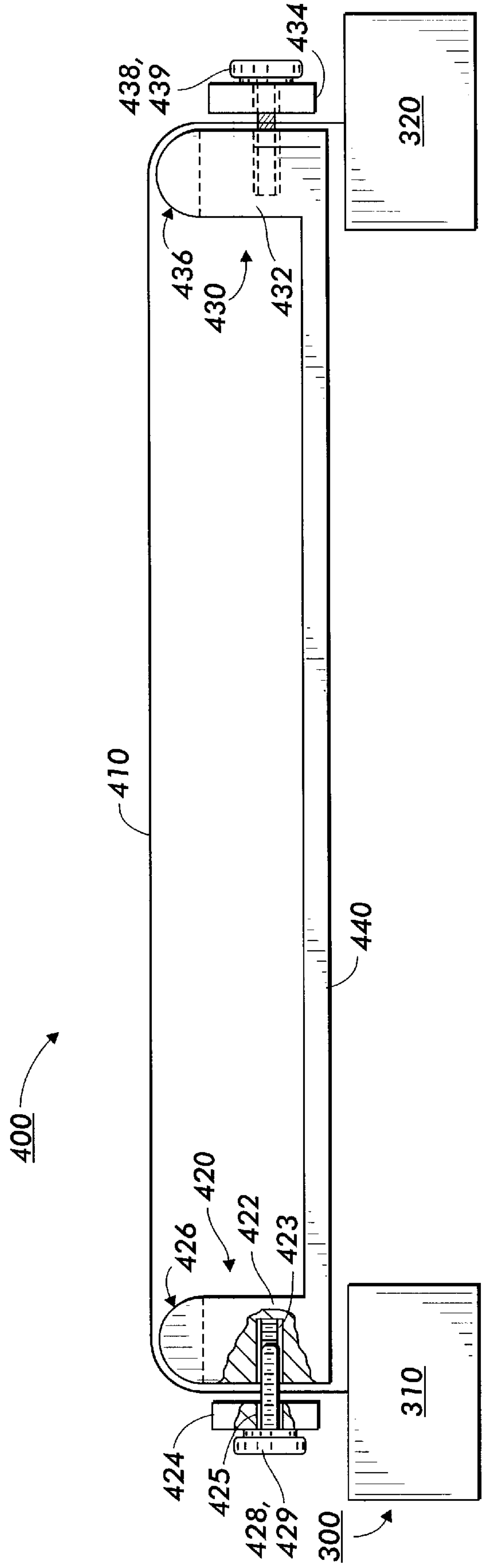
FIG. 5 illustrates a second exemplary embodiment of an externally-tensioned wire retaining module according this invention.
Figure 6:
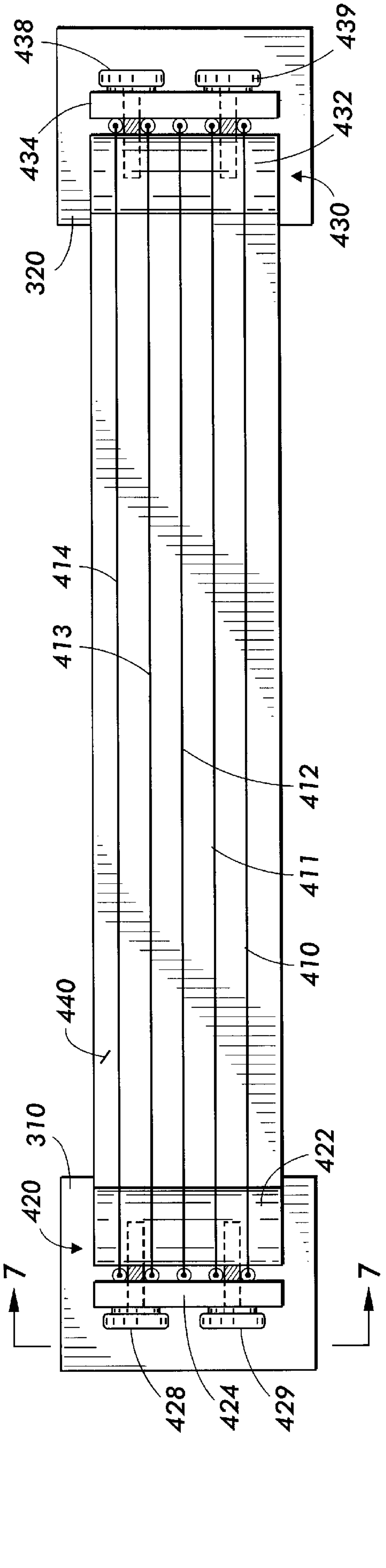
FIG. 6 is a top view of the second exemplary embodiment of the externally-tensioned wire retaining module shown in FIG. 5.

FIGS. 5–7 show a second exemplary embodiment of an externally-tensioned wire retaining module 400 according to this invention. As shown in FIGS. 5–7, one or more externally tensioned wires 400 externally tensioned using the external wire tensioning apparatus 300 are retained between a first tension retaining assembly 420 positioned at a first end of a base plate 440 and a second tension retaining assembly 430 positioned at a second end of the base plate 440.

As in the first exemplary embodiment shown in FIGS. 2–4, the first and second tension retaining assemblies 420 and 430 include a first member 422 and 432, respectively, fixedly attached to a base plate 440. The first and second tension retaining assemblies 420 and 430 also include a detachable second member or plate 424 and 434, respectively, detachably attached to the first members 422 and 432, respectively, by screws 428 and 429, and 438 and 439, respectively. In particular, as shown in FIG. 5, the screws 428 and 429 each pass through a passage 425 formed in the plate 424 and screw into a threaded passage 423 formed in the block 422. Likewise, the screws 438 and 439 pass through passages formed in the plate 434 and screw into threaded passages formed in the block 432.

However, unlike the first exemplary embodiment of the externally-tensioned wire retaining module 200 shown in FIGS. 2–4, each of the first members 422 and 432 of the second exemplary embodiment of the externally-tensioned wire retaining module 400 include curved portions 426 and 436, respectively. In particular, the one or more externally tensioned wires 410 pass between the first members 422 and 432 and the plates 424 and 434, respectively, and over the curved portions 426 and 436 before extending between the first and second tension retaining assemblies 420 and 430. The rounded portions 426 and 436 provide the second exemplary embodiment of the externally-tensioned wire retaining module 400 with a better performance, due to the capstan effect added by turning the one or more externally-tensioned wires 410 over the curved portions 426 and 436.

As in the first exemplary embodiment of the externally-tensioned wire retaining module 200, the second exemplary embodiment of the externally-tensioned wire retaining module 400 retains the one or more wires 410 between the first members 422 and 432 and the plates 424 and 434, respectively, by providing a retaining force between the first members 422 and 432 and the plates 424 and 434, respectively, using the screws 428 and 429, and 438 and 439, respectively. However, as in the first exemplary embodiment of the externally-tensioned wire retaining module 200, any known or later-developed apparatus, device, structure or method may be used to provide the retaining force between the blocks 422 and 432 and the plates 424 and 434, respectively, in place of the screws 428, 429, 438 and 439. Similarly, as in the first exemplary embodiment of the externally-tensioned wire retaining module 200, any known or later-developed apparatus, device, structure or method may be used to permanently or temporarily attach the plates 424 and 434 to the corresponding first member 422 and 434. Likewise, at least portions of ht first members 422 and 432 and portions of the second members or plates 424 and 434 can be made of different materials, as outlined above with respect to the first members 222 and 232 and the second members or plates 224 and 234.

FIGS. 6 and 7 show top and side views of the second exemplary embodiment of the externally-tensioned wire retaining module 400 illustrating how multiple wires 410–414 can be retained.

In both the first and second exemplary embodiments of the externally-tensioned wire retaining modules 200 and 400 shown in FIGS. 2–7, retaining the one or more wires 210 or 410 as illustrated has proven to hold the one or more externally-tensioned wires 210 and 410 at the desired tension, or more precisely, at the desired tension or vibrational frequency in the free span of the wire extending between the ends of the first and second tension retaining modules 220 and 230, or 420 and 430. As outlined above, while the inventors of this application have determined that it is not necessary to use dissimilar materials for the first members 222, 232, 422 or 432 and the second members 224, 234, 424 or 434, using dissimilar materials for these parts of the externally-tensioned wire retaining modules 200 and 400 has proven to be more effective in stably retaining the one or more externally-tensioned wires 210 or 410 at the desired tensions or vibrational frequencies over long periods.

FIG. 8 shows a first exemplary embodiment of the active end 320 of the external wire tensioning device 300 shown in FIGS. 2–7. That is, the external wire tensioning apparatus 300 shown in FIGS. 2–7 generally has a fixed end portion 310 to which the wire or wires to be tensioned are fixedly attached. The active end 320 is then used to apply tension to the wire by elongating the wire to be tensioned 210 or 410 away from the fixed end 310. In particular, the fixed end 310 can use any known or later-developed method for fixedly holding the free end of the one or more wires to be tensioned 210 or 410.

In various exemplary embodiments of the external wire tensioning device 300, the fixed end 320 can use wire retaining structures corresponding to the wire retaining assemblies 220 or 420 shown in FIGS. 2–7. Moreover, in various exemplary embodiments, the fixed end 310, instead of directly fixedly holding the free ends of the wires to be tensioned 210 or 410, can instead fixedly hold one of the externally tensioned wire retaining modules 200 or 400, such that one of the tension retaining modules 220 or 230 of the first exemplary embodiment of the externally tensioned wire retaining module 200 or one of the tension retaining modules 420 or 430 of the second exemplary embodiment of the externally tensioned wire retaining module 400 is used to fixedly hold the one or more wires 210 or 410 against the tension applied by the active portion 320 to externally tension the one or more wires 210 or 410 before the other one of the wire retaining modules 220 or 230, or 420 or 430, respectively, is used to finish retaining the one or more externally-tensioned wires 210 or 410 fully into the corresponding externally tensioned wire retaining module 200 or 400.

In any case, regardless of how the free ends of the one or more wires to be tensioned 210 or 410 are held at the fixed end portion 310 of the external wire tensioning apparatus 300, the active end 320 of the external wire tensioning apparatus 300 includes a base plate 360 extending from the fixed end 310, first, second and third slides 350, 340 and 330 of a three-axis slide system mounted on the base plate 360, and a feedhead 370 mounted on the third slide 330 of the three-axis slide system that moves the feedhead 370 in a direction away from the fixed end 310. The active end 320 also includes a signal conditioner 380 that is connected by a signal line 382 to the feedhead assembly 370, a servo controller 390 that is connected to the signal conditioner 380 by a signal line 382 and a servo-controlled drive element 336 connected to the servo controller 390 by a signal line 392. The servo-controlled drive element 336 drives the third slide 330 of the three-axis slide system based on a control signal from the servo controller 390 over the signal line 392 so that the tension in the one or more wires to be tensioned 210 or 410 is driven to a desired tension value using closed loop feedback control.

As shown in FIG. 8, the first slide 350 of the three-axis slide system includes a z-axis carriage 352 on which the first slide 350 moves so that the three-axis slide system can be used to modify the position of the feedhead assembly 370 in a direction perpendicular to the base plate 360. The second slide 340 of the three-axis slide system is mounted on a carriage 342 that is mounted onto the first slide 350 of the three-axis slide system. The second slide 340 moves along the carriage 342 to modify the position of the feedhead assembly 370 in a direction extending laterally across the base plate 360.

The third slide 330 of the three-axis slide system is mounted on a carriage 332 that is mounted on the second slide 340. The carriage 332 allows the third slide 330 to move the feedhead assembly 370 in a direction along the length of the base plate 360 towards and away from the fixed end 310. In various other exemplary embodiments, the first, second and third slides 350–330 are arranged so that controlling the position of the third slide 330 along the carriage 332 causes the one or more wires to be tensioned 210 or 410 to elongate. In this case, the third slide 330 does not need to move towards/away from the fixed end portion 310, so long as the wire is elongated in a direction away from the fixed end portion 310 along the length of the base plate 360.

Also attached to the third slide 330 is a connection element 334 that connects the slide 330 to the servo-controlled drive device 336. The servo-controlled device 336 and the connection element 334 can be any known or later-developed assembly capable of controllably moving the slide 330 along the carriage 332. In one exemplary embodiment, the drive apparatus 336 is a servo-controlled motor connected by a worm gear to a threaded rod used as the connection element 334. Alternatively, the connection element 334 could be a pinion connected to a servo-controlled motor 336 that engages with a rack on the carriage 332. In this case, the servo-controlled drive device 336 would be directly mounted on the slide 330.

It should also be appreciated that corresponding servo-controlled drive assemblies can be associated with the first and second slides 350 and 340 to allow the first and second slides 350 and 340 to be controllably driven along the corresponding carriages 352 and 342 should it be necessary or desirable to use servo-controlled feedback loops to position the first and second slides 350 and 340 along the carriages 352 and 342, respectively.

It should also be associated that the above-outlined description of the active portion 320 of the external wire tensioning apparatus 300 uses a vertical orientation of the first, second and third slides 350, 340 and 330. However, it should be appreciated that the active portion 320 can be rotated into any particular orientation so long as the first, second and third slides 350, 340 and 330, respectively of the three-axis slide system provide motion along three relatively perpendicular axes.

It should also be appreciated that, while the above-outlined description of the active portion 320 uses the first slide 350 to control the perpendicular position of the feedhead assembly 370, the second slide 340 to control the lateral position of the feedhead assembly 370 and the third slide to control the longitudinal position of the feedhead assembly 370, the slides used to control the perpendicular, lateral and longitudinal position of the feedhead assembly 370 can be provided in any other appropriate configuration. Thus, the slide closest to the base plate 360 could be used to control the lateral position of the feedhead assembly 370 while the next slide is used to control the perpendicular position and the next slide is used to control the longitudinal position.

Figure 9:
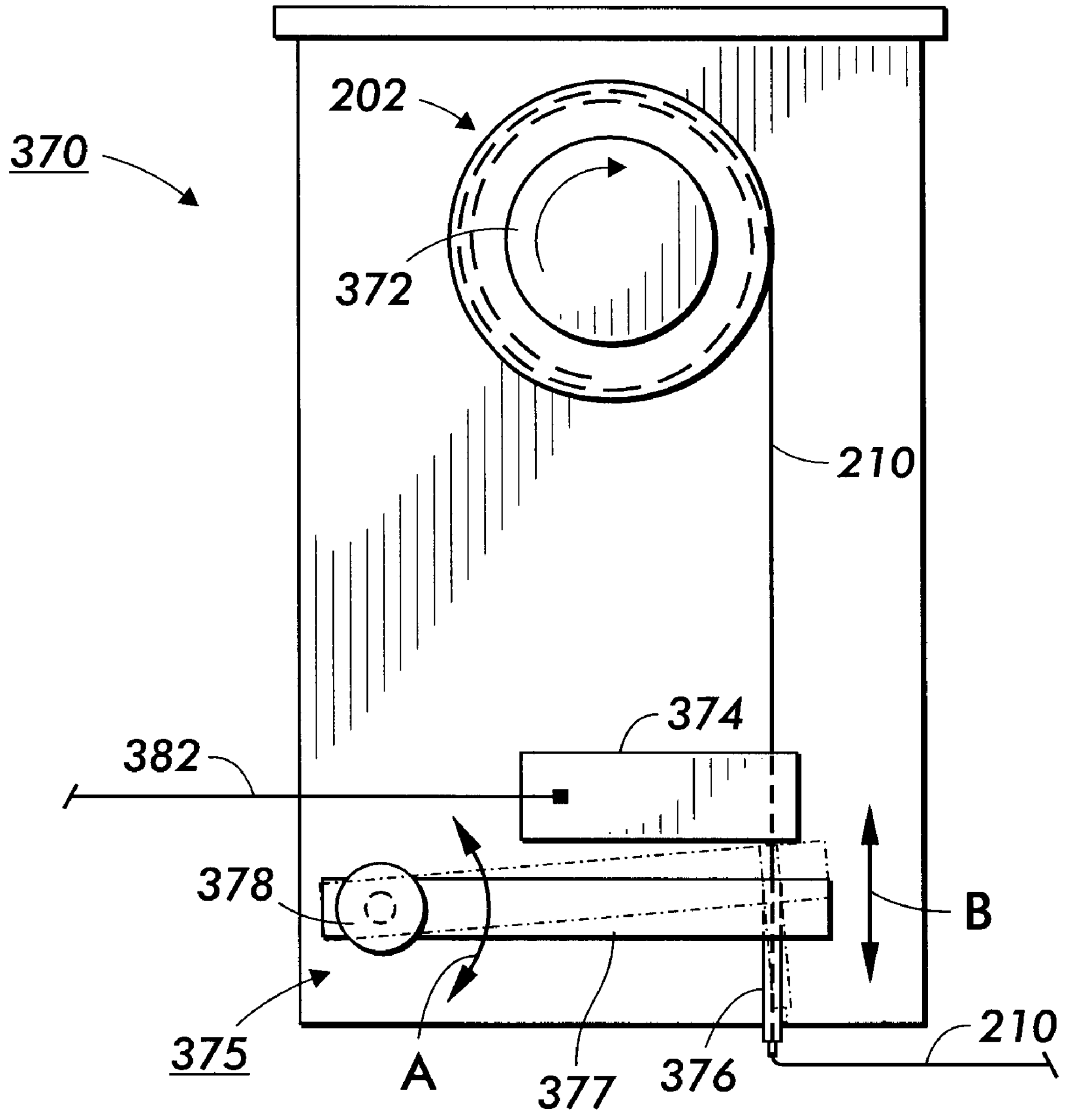
FIG. 9 shows in greater detail one exemplary embodiment of a feedhead assembly of the automatic wire tensioning apparatus of FIG. 8.

FIG. 9 shows in greater detail one exemplary embodiment of the feedhead assembly 370. As shown in FIG. 9, the feedhead assembly 370 includes a rotatable and rotatably securable axle 372 onto which a spool 202 of the wire to be tensioned 210 or 410 is securely mounted. The wire to be tensioned 210 or 410 is withdrawn from the spool 202 by allowing the axle 372 to rotate. The wire to be tensioned 210 or 410 is withdrawn past a load cell 374 of the feedhead assembly 370 and through a pivot arm assembly 375.

In particular, the wire to be tensioned 210 or 410 is passed through a nozzle 376 of the pivot arm assembly 370. After passing through the nozzle 376, the wire to be tensioned 210 or 410 is redirected at a fairly significant angle towards the fixed end portion 310 of the external wire tensioning apparatus 300. The wire to be tensioned 210 or 410 is continued to be withdrawn from the spool 202 until a free end of the wire to be tensioned 210 or 410 can be fixedly attached to the fixed end 310 of the external wire tensioning apparatus 300. The axle 372 is then rotatably secured to prevent any further amount of the wire to be tensioned 210 or 410 to be withdrawn from the spool 202.

As shown in FIG. 9, the pivot arm assembly 375 includes a pivot arm 377 to which the nozzle 376 is attached and through which the wire to be tensioned 210 or 410 passes. The pivot arm 377 is attached to a pivot 378, which is pivotably mounted on the feedhead assembly 370 to allow the pivot arm assembly 375 to pivot. The pivot motion of the pivot arm assembly 375 is indicated by the arrow A shown in FIG. 9. In particular, when the pivot arm assembly 375 pivots upward about the pivot 378, the free end of the pivot arm 377 moves vertically in the direction indicated by the arrow B shown in FIG. 9. As a result, when the pivot arm assembly 375 pivots upwardly, the free end of the pivot arm 377 bears against the load cell 374. The load cell 374 generates a signal representative of the force applied against the load cell 374 by the free end of the pivot arm 377. This load cell signal is output on the signal line 382 to the signal conditioner 380 shown in FIG. 8.

In operation, after the wire to be tensioned 210 or 410 is manually spooled out from the feedhead 370 and clamped, retained, or otherwise attached to the fixed end 310, the rotatable axle 372 within the feedhead 370 is then locked into place, as outlined above. With the wire to be tensioned 210 or 410 being relatively taut, the servo-controlled third slide 330 on which the feedhead assembly 370 is mounted is controlled by the servo-controller 390 driving the servo-controlled drive device 336 to move the third slide 330 along the carriage 332 in a direction away from the fixed end portion 310. This elongates the wire to be tensioned 210 or 410 and thus creates a tensile force in the wire to be tensioned 210 or 410. As a result of elongating the wire to be tensioned 210 or 410 and placing a tensile force in the wire 210 or 410, the wire 210 or 410 applies a force against the pivot arm assembly 375 through the nozzle 376 that drives the free end of the pivot arm 377 upwards in the direction B against the load cell 374.

The amount of force applied by the pivot arm 377 against the load cell 374 results in the load cell 374 generating a corresponding load cell signal that is output on the signal line 382 to the signal conditioner 380. The signal conditioner 380 amplifies the signal generated by the load cell 374. The amplified signal from the signal conditioner 380 is then output on the signal line 384 to the servo-controller 390. The servo-controller 390 compares the amplified signal from the signal conditioner 380 to a signal value corresponding to the desired tension to be established in the wire to be tensioned 210 or 410.

The difference between the amplified signal from the signal conditioner 380 and the desired value corresponding to the desired amount of tension in the wire 210 or 410 corresponds to the amount of movement that needs to be applied to the third slide 330, while the sign of the error signal indicates whether the wire 210 or 410 is under-tensioned or over-tensioned. Accordingly, the servo-controller 390 outputs a drive signal on the signal line at 392 to the servo-controlled drive apparatus 336 to change the position of the third slide 330 along the carriage 332 to increase or decrease the amount of tension in the wire to be tensioned 210 or 410. As a result, the wire 210 or 410 pulls either harder or not as hard on the nozzle 376, changing the amount of force the free end of the pivot arm 377 applies to the load cell 374, thus changing the value of the load cell signal output by the load cell on the signal line 382. Thus, the position of the feedhead assembly is determined using closed loop feedback control to obtain the desired tension in the wire to be tensioned 210 or 410.

In various exemplary embodiments, the external wire tensioning apparatus 300 provides one or more of three advantages: the ability to tension and measure the tension in a fine wire, the ability to measure and control the tension in the wire using closed loop feedback control, and the ability to easily set the desired tension level in the wire to be tensioned 210 or 410, by setting the desired value to which the amplified signal from the signal conditioner 380 is to be compared.

In particular, many tensioning devices cannot measure high gauge, i.e., very fine, wire. This is due mainly to the limitations of such devices in being able to handle such high gauge wire. For example, fine wire tends to slip through the wire securing devices. In contrast, the external wire tensioning apparatus 300 can measure fine wire that is 0.0025 inch or less in diameter, i.e., roughly 40–42 AWG. Various exemplary embodiments of the external wire tensioning apparatus 300 of this invention are able to measure such fine wire by using a standard pin vise to secure the wire in place at the fixed end 310. Since the wire is spooled out, the external wire tensioning apparatus 300 is able to rely on one end of the wire being clamped at the pin vise and the other end relying on the resistance provided by securing the spool in the feedhead assembly 370. The inventors of this invention have determined that this is an effective technique for securing and measuring the tension in such fine wire.

The feedhead assembly 370 uses a standard, precision load cell. In various exemplary embodiments, the load cell is a model GS0-1K from Transducer Techniques. With this load cell, the tension in the wire can be accurately measured based upon the mechanical input of the pivot arm 377 biasing up against the contact point of the load cell 374. The force measured at the load cell 374 correlates to an input signal sent by the load cell 374 over the signal line 382 to the signal conditioner 380. In various exemplary embodiments, the signal conditioner 380 is a Daytronix model 4077. The conditioned or amplified signal output by the signal conditioner 380 over the signal line 384 is then sent to the servo-controller 390. In various exemplary embodiments, the servo-controller 390 is manufactured by Whedco, and controls the actuation of the third slide 330 supporting the feedhead 370.

Some of the conventional tensioning devices currently available are manually operated devices. In the inventors' experience, this is a very unreliable process. The external wire tensioning apparatus 300 according to this invention is programmable, and thus is able to set a wide variety of values in order to achieve the desired tension in the wire 210 to be tensioned.

The servo-controller 390 according to this invention is able to use many different input variables when programming the desired tension to be applied to the wire to be tensioned 210 or 410. These variables include pull velocity, travel distance and ultimate tension value to be obtained. Because the external wire tensioning apparatus 300 according to this invention allows the user to set the tension and then automatically achieves the set tension in the wire to be tensioned 210 or 410, the external wire tensioning device 300 allows the wire tensioning process to be more reliably and consistently performed. In addition, the external wire tensioning apparatus 300 according to this invention is highly flexible. Thus, the external wire tensioning apparatus 300 can be used to perform a wide variety of tests on the wire to be tensioned 210 or 410, as well as tensioning the wire 210 or 410 so that it can be secured in the externally-tensioned wire retaining modules 200 and/or 400.

It should also be appreciated that the feedhead assembly 370 can be modified to supply multiple wires to be tensioned 210 or 410, rather than a single wire 210 or 410. Alternatively, the external wire tensioning apparatus 300 can be modified to provide multiple feedheads 370 mounted on the third slide 330. Furthermore, the external wire tensioning apparatus 300 can be modified to provide multiple third slides 330, each of which has a separate feedhead assembly 370 mounted on it to provide multiple independently tensionable wires 210. Finally, multiple instances of the external wire tensioning apparatus 300 can be provided to allow multiple wires to be tensioned 210 or 410.

These multiple wire tensioning embodiments of the external wire tensioning apparatus 300 can thus be used to provide the multiple wires 210–216 or 410–414 implemented in the first and second embodiments of the externally tensioned wire retaining modules 200 and/or 400. It should be appreciated that any number of wires can be provided in any of these various exemplary embodiments of the external wire tensioning apparatus 300 or in the various exemplary embodiments of the externally-tensioned wire retaining modules 200 and/or 400 described above. It should also be appreciated that any known or later-developed method for providing closed loop feedback control in place of the signal conditioner 380 and the servo-controller 390 can be used with the external wire tension apparatus 300.

Figure 10:
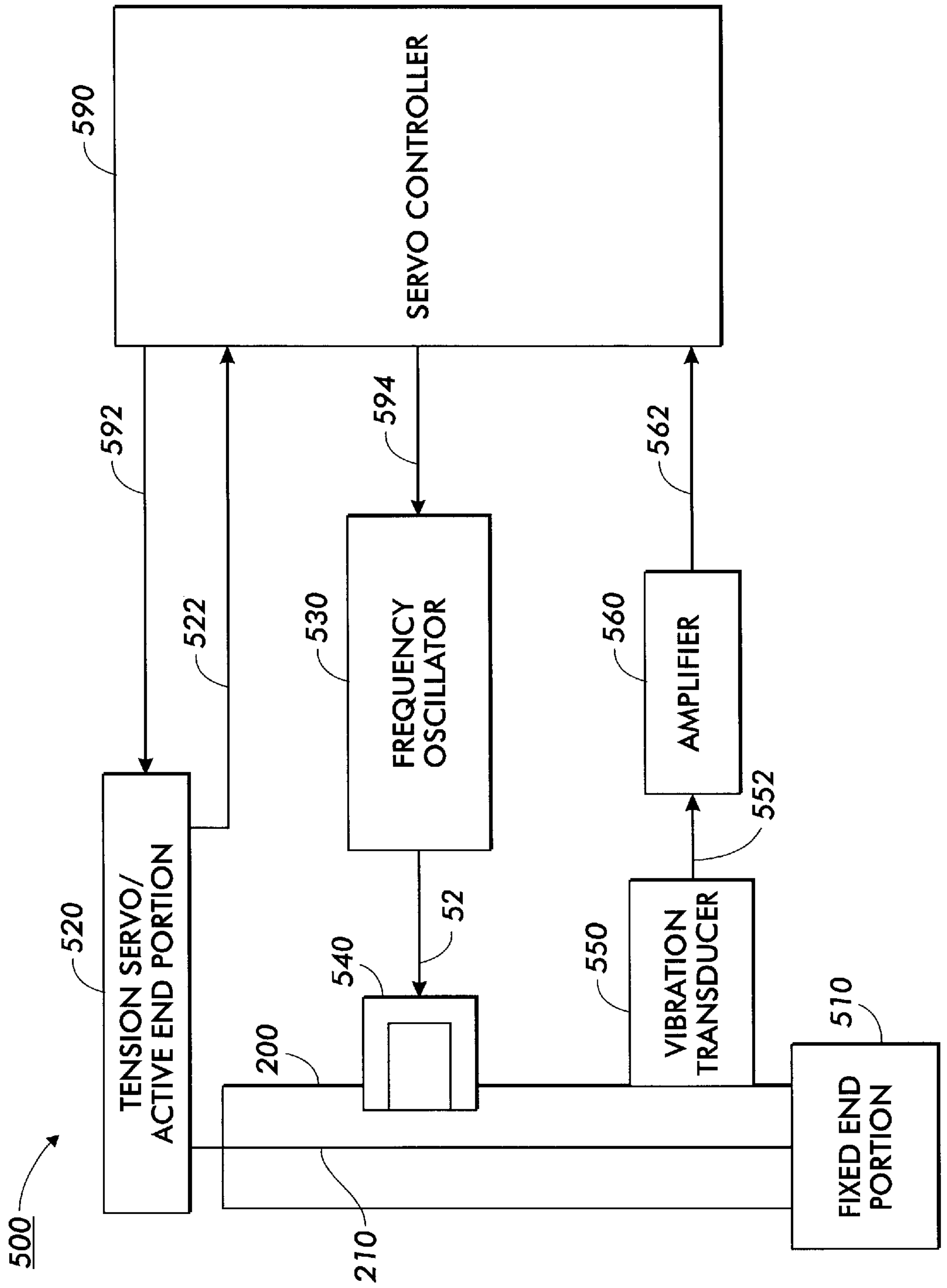
FIG. 10 is a block diagram and top view of a second exemplary embodiment of an automatic wire tensioning device for automatically tensioning wires externally from a wire retaining module according to this invention.

FIG. 10 is a block diagram and top plan view of a second exemplary embodiment of an external wire tensioning apparatus 500. In particular, the second exemplary embodiment of the external wire tensioning apparatus 500 can be used in place of the first exemplary embodiment of the external wire tensioning apparatus 300 shown in FIGS. 2–7. Specifically, the second exemplary embodiment of the external wire tensioning apparatus 500 shown in FIG. 10 has a fixed end portion 510 and an active end portion 520 that generally correspond to the fixed and active end portions 310 and 320 of the first exemplary embodiment of the external wire tensioning apparatus 300 shown in FIGS. 2–7.

That is, like the fixed and active end portions 310 and 320 of the first exemplary embodiment of the external wire tensioning apparatus 300 shown in FIGS. 2–7, the wire or wires to be tensioned 210 or 410 are fixedly attached to the fixed end portion 510. The active end portion 520 is then used to apply tension to the wire 210 or 410 by elongating the wire to be tensioned 210 or 410 away from the fixed end 510. In particular, the fixed end 510 can use any known or later-developed method for fixedly holding the free end of the one or more wires to be tensioned 210 or 410.

In various exemplary embodiments of the second external wire tensioning device 500, the fixed end 510 can use wire retaining structures corresponding to the wire retaining assemblies 220 or 420 shown in FIGS. 2–7. Moreover, in various exemplary embodiments, the fixed end 510, instead of directly fixedly holding the free ends of the wires to be tensioned, can instead fixedly hold one of the externally tensioned wire retaining modules 200 or 400, such that one of the tension retaining modules 220 or 230 of the first exemplary embodiment of the externally tensioned wire retaining module 200 or one of the tension retaining modules 420 or 430 of the second exemplary embodiment of the externally tensioned wire retaining module 400 is used to fixedly hold the one or more wires 210 or 410 against the tension applied by the active portion 520 to externally tension the one or more wires 210 or 410 before the other one of the tension retaining modules 220 or 230, or 420 or 430, respectively, is used to finish retaining the one or more externally tensioned wires 210 or 410 fully into the corresponding externally tensioned wire retaining module 200 or 400.

In any case, regardless of how the free ends of the one or more wires to be tensioned 210 or 410 are held at the fixed end portion 510 of the second external wire tensioning apparatus 500, the active end 520 of the external wire tensioning apparatus 500 is used to apply tension to the one or more wires 210 or 410. In particular, the active end 520 can be implemented using the active end 320 of the first exemplary embodiment of the external wire tensioning apparatus 300 shown in FIGS. 8 and 9.

That is, the active end 520 is a tension servo device that controllably tensions the one or more wires to be tensioned 210 or 410 based on control signals from a controller 590. The active end 520 can also generate tension feedback signals, as in the first exemplary embodiment of the external wire tensioning apparatus 300. However, it should be appreciated that it is not necessary in this second exemplary embodiment of the external wire tensioning apparatus 500 to include the loadcell 374 in the feedhead 370.

As shown in FIG. 10, the second exemplary embodiment of the external wire tensioning apparatus 500 also includes a frequency oscillator 530, an electromagnet 540, a vibration transducer 550, an amplifier 560 and the controller 590. In the exemplary embodiment shown in FIG. 10, the controller 590 outputs a tension signal over a signal line 592 to the active end portion 520 to increase or decrease the tension in the one or more wires 210 or 410. The controller 590 also outputs a drive signal over a signal line 594 to the frequency oscillator 530. In various exemplary embodiments, the frequency oscillator 530 is a voltage controlled oscillator and the drive signal to the frequency oscillator 530 is a voltage controlled oscillator drive signal.

The frequency oscillator 530 outputs a voltage controlled oscillatory drive signal to the electromagnet 540 over a drive signal line 532. In response, the electromagnet 540 creates an alternating electromagnetic field in a region through which the one or more wires to be tensioned 210 or 410 pass. This alternating electromagnetic field alternates at the frequency of the voltage controlled oscillatory drive signal. This alternating electromagnetic field induces a vibration in the one or more wires to be tensioned 210 or 410. In particular, the one or more wires to be tensioned 210 or 410 will vibrate at the frequency of the voltage controlled oscillatory drive signal.

Thus, it should be appreciated that the frequency of the induced vibration in the one or more wires to be tensioned 210 or 410 is completely controllable, by controlling the amplitude of the voltage controlled oscillator drive signal generated by the controller 590. In particular, the controller 590 will output the voltage controlled oscillator drive signal at an amplitude that causes the frequency oscillator 530 to output the voltage controlled oscillatory drive signal at a desired wire vibrational frequency.

In response to the vibration induced in the one or more wires to be tensioned 210 or 410, the vibration transducer 550 detects the amplitude of the induced vibration in the one or more wires to be tensioned 210 or 410. The vibration transducer 550 outputs a signal on the signal line 552 to the amplifier 560 that corresponds to the amplitude of the induced vibration in the one or more wires to be tensioned 210 or 410. The amplifier 560 amplifies the signal from the vibration transducer 550 to a level usable by the controller 590.

In various exemplary embodiments, the vibration transducer 550 is one or more accelerometers. In this case, one or more vibrational transducers 550 are attached onto a corresponding wire to be tensioned 210 or 410, anywhere along the length of that wire. In various exemplary embodiments, the one or more vibration transducers 550 for each wire to be tensioned 210 or 410 are located near where the one or more wires to be tensioned 210 or 410 are fixed to the externally tensioned wire retaining module 200 or 400.

In various other exemplary embodiments, the vibration transducer 550 is a capacitive sensor. In this case, the vibration transducer 550 outputs a signal on the signal line 552 to the amplifier 560. The amplitude of this voltage signal indicates whether the desired frequency is the same as the natural vibrational frequency of the wire to be tensioned 210 or 410. It should also be appreciated that any other known or later-developed type of vibration transducer usable to sense vibration in a wire can be used in place of the accelerometer or the capacitive sensor.

Initially, the wires to be tensioned 210 or 410 can be set at a tension below the desired tension. Thus, in response to the amplified induced vibration amplitude signal, the controller 590 determines if the tension in the one or more wires 210 or 410 to be tensioned needs to be increased. The controller 590 then outputs an updated tension signal over the signal line 592 to the active end portion 520 to increase the tension in the one or more wires 210 or 410. The controller 590 also outputs the drive signal over the signal line 594 to the frequency oscillator 530.

Alternatively, the wires can be set at a tension above the desired tension. In response to the amplified induced vibration amplitude signal, the controller 590 determines if the tension in the one or more wires 210 or 410 to be tensioned needs to be decreased. The controller 590 then outputs an updated tension signal over the signal line 592 to the active end portion 520 to decrease the tension in the one or more wires 210 or 410. The controller 590 also outputs the drive signal over the signal line 594 to the frequency oscillator 530.

The process of increasing or decreasing the tension in the one or more wires to be tensioned 210 or 410 is repeated until the vibrational frequency of the one or more wires to be tensioned is approximately equal to the desired vibrational frequency, as indicated by the frequency or amplitude of the voltage controlled oscillatory drive signal generated by the frequency oscillator 530.

In particular, when a peak vibration amplitude is detected in the one or more wires to be tensioned 210 or 410 by the vibration detector 550, the process is halted to maintain the tension in the one or more wires to be tensioned 210 or 410 at the current tension applied by the active end 520. In various exemplary embodiments, if the tension in each of the various wires 210–216 or 410–414 is to be different than the tension in the other ones of the wires 210–216 or 410–414, at least a slight difference in the vibrational frequencies between the wires should be maintained so that the controller 590 can distinguish or resolve between the individual wire frequencies. In various exemplary embodiments, the difference in the vibrational frequencies between the wires to be tensioned my be at least 5 Hz.

Alternatively, the tension in the one or more wires to be tensioned 210 or 410 can be set by comparing the frequency of the voltage controlled oscillatory drive signal output by the frequency oscillator 530 to the vibrational frequency of the one or more wires to be tensioned 210 or 410. In this case, the controller 590 bases the control of the tension applied by the active end portion 520 based on the frequency, rather than the amplitude, of the signal generated by the vibration transducer 550. In particular, the frequency of the signal generated by the vibration transducer 550 is at the natural vibrational frequency of the one or more wires 210 or 410 to be tensioned.

When the frequency of the voltage controlled oscillatory drive signal output by the frequency oscillator 530 and the natural frequency of the one or more wires to be tensioned 210 or 410 are different, the vibrational waveform of the signal from the vibration transducer 550 is out of phase with that of the voltage controlled oscillatory drive signal output by the frequency oscillator 530. In contrast, when the one or more wires to be tensioned 210 or 410 are tensioned so that their natural vibrational frequency corresponds to the desired vibrational frequency for the one or more wires to be tensioned 210 or 410, the waveforms of the signal from the vibration transducer 550 is in phase with that of the voltage controlled oscillatory drive signal output by the frequency oscillator 530.

In various exemplary embodiments, the active end portion 520 can be used not only to apply tension to the one or more wires to be tensioned 210 or 410, but, as in the first exemplary embodiment of the external wire tensioning apparatus 300, can be used to provide a tension feedback signal on the signal line 522 to the controller 590. As in the first exemplary embodiment of the external wire tensioning apparatus 300, the tension feedback signal provides a direct measurement of the tension on the one or more wires to be tensioned 210 or 410, but only an indirect measurement of the vibrational frequency of the wires to be tensioned 210 or 410. In various exemplary embodiments, the active end portion 320, and especially the feedhead 370 using the load cell 374 and pivot arm 375 can be used as the active end portion 520 that is capable of generating the tension feedback signal.

While this invention has been described in conjunction with the exemplary embodiments outlined above, it is evident that many alternatives, modifications and variations will be apparent to those skilled in the art. Accordingly, the exemplary embodiments of the invention, as set forth above, are intended be illustrative, not limiting. Various changes may be made without departing from the spirit and scope of the invention.

What is claimed is:

1. An external wire tensioning apparatus, comprising:

a wire retaining module;

a first portion physically external to the wire retaining module;

a second portion physically external to the wire retaining module, wherein each of the first and second portion is able to hold at least one wire to be tensioned; and a servo controller capable of outputting a signal to the second portion to alter at least one of a tension and a vibrational frequency in at least one of the at least one wire to be tensioned when the at least one wire to be tensioned is held by the first and second portions.

2. The external wire tensioning apparatus of claim 1, further comprising:

an electromagnet; and a frequency oscillator that inputs a drive signal from the servo controller and that outputs a drive signal to the electromagnet;

wherein the electromagnet creates an alternating electromagnetic field in response to the drive signal in a region through which at least one of the at least one wire to be tensioned will pass when the at least one wire to be tensioned is held by the first and second portions.

3. The external wire tensioning apparatus of claim 2, wherein the at least one wire vibrates in response to the alternating electromagnetic field.

4. The external wire tensioning apparatus of claim 3, further comprising a vibration transducer, wherein, when the at least one wire to be tensioned is held by the first and second portions, the vibration transducer detects an amplitude of the vibration of the at least one wire and outputs a detection signal based on the detected amplitude.

5. The external wire tensioning apparatus of claim 4, wherein the vibration transducer is an accelerometer.

6. The external wire tensioning apparatus of claim 4, wherein the vibration transducer is an capacitive sensor.

7. The external wire tensioning apparatus of claim 4, wherein, when the at least one wire to be tensioned is held by the first and second portions, the servo controller determines if the tension or the vibrational frequency in the at least one wire to be tensioned needs to be altered based on the detection signal and adjusts the tension in the at least one wire to be tensioned.

8. The external wire tensioning apparatus of claim 7, wherein the servo controller adjusts the tension in at least one of the at least one wire to be tensioned in response to the detection signal until the detection signal indicates a natural vibrational frequency of that at least one wire to be tensioned corresponds to a frequency of the alternating electromagnetic field.

9. The external wire tensioning apparatus of claim 7, wherein the servo controller adjusts the tension in at least one of the at least one wire to be tensioned in response to the detection signal until the detection signal indicates a tension in that at least one wire to be tensioned corresponds to a desired tension.

10. The external wire tensioning apparatus of claim 2, wherein the drive signal is a voltage controlled oscillatory drive signal capable of causing the at least one wire to vibrate in response to the alternating electromagnetic field.

11. The external wire tensioning apparatus of claim 1, wherein the second portion includes;

a first portion;

a second portion;

a first slide;

a feedhead mounted on the first slide;

a servo controller capable of outputting a signal to the second portion to alter at least one of a tension and a vibrational frequency in at least one of the at least one wire to be tensioned and wherein the first slide moves in a direction away from the first portion to apply tension to the at lease one wire to be tensioned when the at least one wire to be tensioned is held by the first and second portions.

12. The external wire tensioning apparatus of claim 11, further comprising a base assembly, wherein the second portion further includes:

a second slide mounted on the base assembly; and a third slide mounted on the second slide, wherein the first slide is mounted on the third slide.

13. The external wire tensioning apparatus of claim 11, further comprising:

a signal conditioner connected to the feedhead assembly, and a servo controlled drive element connected to the servo controller, wherein:

the servo controller is connected to the signal conditioner; and the servo controlled drive element drives the first slide based on a control signal from the servo controller.

14. The external wire tensioning apparatus of claim 11, wherein the feedhead assembly comprises:

a rotatably securable axle onto which one or more wires to be tensioned can be securably mounted; and a pivot arm assembly.

15. The external wire tensioning apparatus of claim 14, wherein the pivot arm assembly comprises:

a pivot arm and a nozzle though which at least one of the at least one wire to be tensioned passes when that at least one wire to be tensioned is held by the first and second portions; and a load cell, wherein, as the pivot arm assembly rotates, the pivot arm contacts the load cell.

16. The external wire tensioning apparatus of claim 15, wherein:

the load cell generates a signal representative of a force applied by the pivot arm and outputs the signal to the signal conditioner; and the signal conditioner amplifies the signal and outputs the signal to the servo controller.

17. The external wire tensioning apparatus of claim 1, wherein the first portion is fixed and the second portion is movable.

18. A method for externally tensioning a wire of a wire retaining module, comprising:

applying tension to the wire using an apparatus physically external to the wire retaining module;

sensing a characteristic of the wire;

determining if the characteristic of the wire has reached a desired value;

repeating the applying sensing and determining steps until the characteristics of the wire has met the desired value; and detaching the wire retaining module from the physically external apparatus.

19. The method of claim 18, wherein applying tension to the wire comprises:

attaching one end of a wire to a fixed point; and attaching another end of the wire to a movable point.

20. The method of claim 19, wherein applying tension to the wire further comprises moving the movable point to apply tension to the wire.

21. The method of claim 18, further comprising securing the tensioned wire within the wire retaining module after the characteristic of the wire has reached the desired value.

22. The method of claim 18, wherein sensing the characteristic of the wire comprises:

applying an alternating electromagnetic field in a region through which the wire passes; and sensing an amplitude of a vibration induced in the wire.

23. The method of claim 22, wherein determining if the characteristic of the wire has reached the desired value comprises determining if the amplitude of the induced vibration indicates that a vibrational frequency of the wire has a desired relationship to a frequency of the alternating electromagnetic field.

24. The method of claim 18, wherein sensing the characteristic of the wire comprises:

applying an alternating electromagnetic field in a region through which the wire passes; and sensing a frequency of a vibration induced in the wire.

25. The method of claim 24, wherein determining if the characteristic of the wire has reached the desired value comprises determining if the vibrational frequency of the wire has a desired relationship to a frequency of the alternating electromagnetic field.

26. The method of claim 18, wherein sensing the characteristic of the wire comprises sensing a tension in the wire.

27. The method of claim 26, wherein determining if the characteristic of the wire has reached the desired value comprises determining if the tension in the wire has a desired relationship to a desired tension.

* * * * *